UNITED STATES PATENT OFFICE.

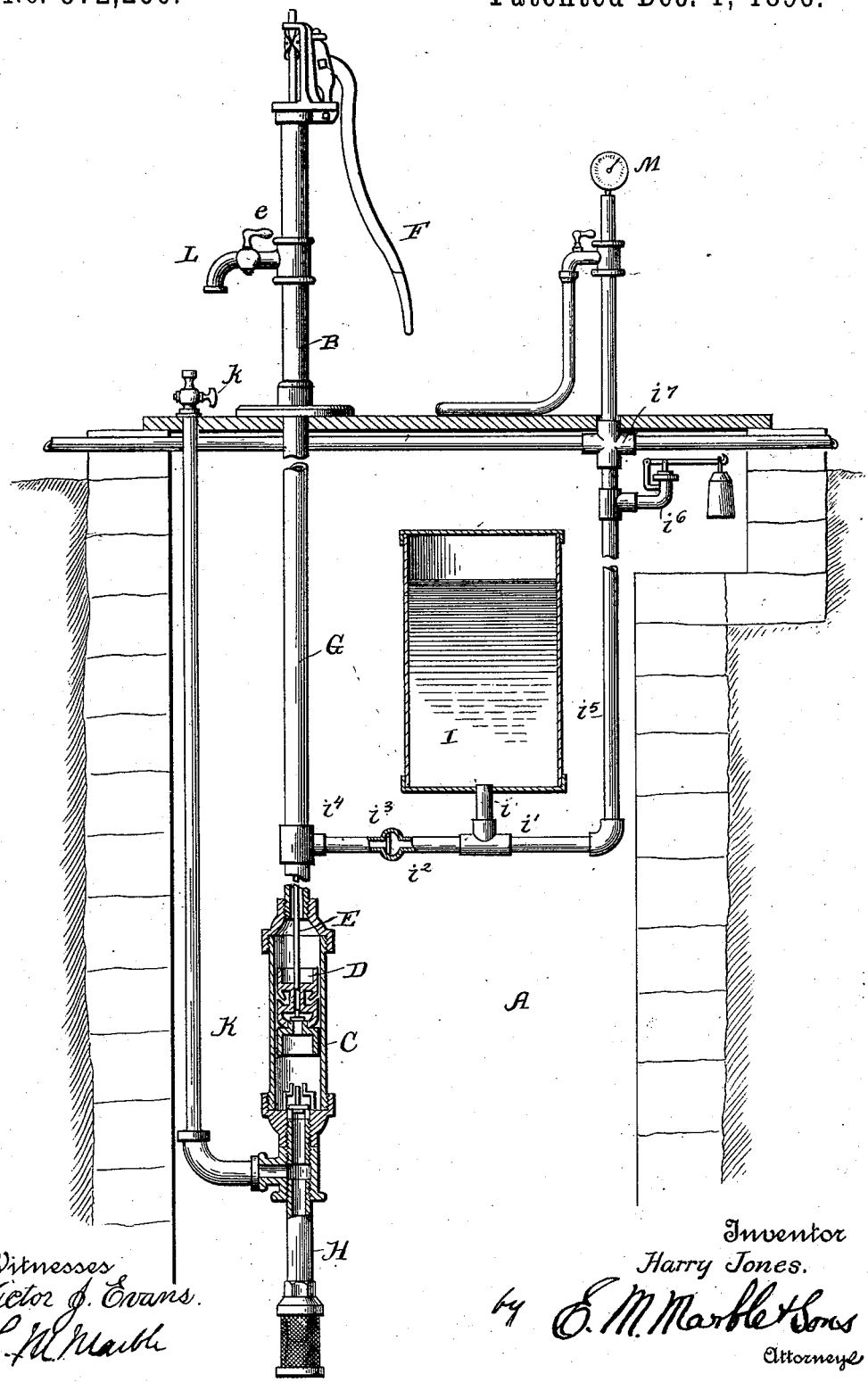

HARRY JONES, OF RICHMOND, INDIANA.

PUMP.

SPECIFICATION forming part of Letters Patent No. 572,260, dated December 1, 1896.

Application filed September 1, 1896. Serial No. 604,552. (No model.)

*To all whom it may concern:*

Be it known that I, HARRY JONES, a citizen of the United States, residing at Richmond, in the county of Wayne and State of Indiana, have invented certain new and useful Improvements in Pumps; and I do hereby declare the following to be a full, clear, and exact description of the invention, such as will enable others skilled in the art to which it appertains to make and use the same.

My invention relates to improvements in pumps, and particularly to improvements in that class of pumps which are designed to make use of the expansive force of compressed air, in whole or in part, to deliver a volume of water at a desired point of discharge; and it consists in the improved compressed-air water-elevator pump which will be hereinafter fully described, and particularly pointed out in the claims.

The object of my invention is to provide a pump which will not only be capable of use as an ordinary pump, but also to supply a cylinder or reservoir intermediate between the pump-cylinder and the point of discharge, and preferably stationed in the well itself below the line of frost, first with air until the air in the cylinder or reservoir reaches any desired degree of compression, and, second, with a quantity of water, thus producing a reservoir of water which can be kept filled without interfering with the customary action of the pump, but from which at the same time water will be discharged automatically and to a predetermined height.

The need for a pump capable of performing the functions above stated is found particularly in towns too small to have a regular system of water supply from waterworks and in isolated country houses where the conditions are not favorable for keeping large tanks filled with water. In such localities it is difficult, if not impossible, to provide for an instant supply of water at the sudden breaking out of a fire and to enjoy the use of such luxuries as the modern bath-tub and water-closet. Furthermore, the drawing of any supply of water can only be accomplished by the expenditure of considerable effort and the loss of much time, and the water, if stored, quickly becomes stale and unpalatable.

By the use of my improved pump I am able to meet the difficulties thus stated by providing for the automatic supply of a quantity of water, which will be large or small in accordance with the size of the reservoir maintained, which water is always fresh and at a uniform temperature—the temperature of the ground. The supply of water thus constantly at hand is sufficient for use in extinguishing fires at their incipiency, for supplying bath-rooms, for supplying kitchens with running water, and for other like uses.

In accomplishing the object of my invention I may make use of any style of lift-pump, as my invention does not relate to the details of construction of the pump itself, but rather to the manner in which it is to be used. In connection with the pump, and preferably in the well itself below the line of frost, I station an air-tight reservoir, which may be of any suitable size and which is connected, preferably at its bottom, with a pipe conveying the water from the pump-cylinder to the discharge-spout of the pump and with the several points of discharge for the reservoir. This is the reservoir which I purpose to supply with air under pressure and then with a quantity of water. A check-valve prevents the return to the main pipe of air or water introduced therein, and a safety-valve in the discharge-pipe insures safety from explosion. Below the pump-cylinder, but above the water-level, I form an opening in the pipe which leads downward into the well-water, and for convenience in operation connect with said opening a small pipe or tube which extends upward to the ground-level and is provided with a valve, so that it may be opened or closed at pleasure.

The pump just described operates just as an ordinary pump if the air-supply pipe be closed; but if the air-supply pipe be opened and the discharge-spout of the pump closed air will be forced into the reservoir until it reaches any desired pressure, and then, upon the closing of the air-supply pipe, water will be forced into said reservoir until the pressure in the cylinder reaches the limit at which the safety-valve has been placed, when the condition of the water in the reservoir will be evidenced by discharge of water through the safety-valve. After a charge of water has once been placed in the reservoir it is not necessary to again increase the air supply until such air has been absorbed in the water to such an extent as to interfere with the proper expulsion of the water. The resupply of air can then be effected without drawing off the water in the reservoir, a suitable pressure-gage indicating when a sufficient quantity of air has been furnished.

My invention is fully illustrated in the drawing which accompanies and forms a part of this specification, in which the same reference-letters refer to the same or corresponding parts, and which is an elevation of my pump, partly in section and partly broken away.

Referring to the drawing, A represents the well in connection with which my pump is to be used, and B the pump. This pump forms no part of my present invention and may be of any of the well-known makes of pumps, so long as it uses a pump-cylinder and a piston working therein, or other equivalent mechanism, to insure the discharge of water from the mouth of the pump.

The pump which is shown in the drawing, and which on account of its cheapness, durability, and prompt action I preferably employ, is of my invention and is fully described in United States Letters Patent No. 528,436, granted to me on the 30th day of October, 1894. This pump consists, essentially, of the cylinder C, the water-packed piston D, working therein, the pipe-rod E, the handle F, the pipes G and H, and the valves shown; but any other efficient lift-pump may be substituted in its stead without interfering with the operation of my present invention. In connection with this pump I employ a reservoir I, which, in order to avoid frost, to insure an even temperature to the water contained therein, and to insure the freshness of the water, I preferably place in the well itself below the line of frost, though it may be placed elsewhere if desired. This reservoir is air-tight and should be tested to stand a pressure considerably greater than that to which it is to be subjected before being installed. It is connected to the water-discharge pipe G by the pipe $i$, T-coupling $i'$, pipe $i^2$, (in which the check-valve $i^3$ is stationed,) and coupling $i^4$. It is also connected to the point or points of discharge by the discharge-pipe $i^5$, which is provided with a safety-valve $i^6$ and extends to the + coupling $i^7$, from which branch the pipes running to the several points of discharge.

To the water-supply pipe H, above the level of the water, but below the cylinder C, I attach an air-pipe K, which is provided with a cock $k$, by which it may be opened or closed and for convenience extends to the surface of the ground. Any other form of air-opening may be employed so long as it may be opened or closed at will.

The water-discharge spout L of the pump B is also provided with a valve $e$, by closing which outflow through the spout is prevented.

In the operation of my pump, if the air-supply pipe K be closed and the spout-cock $e$ opened, the pump will act as any other pump and will discharge water through the spout as long as the handle F is operated. In order to charge the reservoir I, it is only necessary to close the spout-cock $e$ and to open the air-supply cock $k$. Further operation of the pump will now result in air being sucked downward through the air-supply pipe and forced into the reservoir I. Air should be forced into the reservoir until the pressure therein, as indicated by the pressure-gage M, which is to be found on an upward extension of the pipe $i^5$, is sufficient to force a body of water to the maximum height to which discharge is to take place. When the air is sufficiently compressed, the cock $k$ should be closed. As the operation of the pump now continues, water will be forced into the reservoir I, gradually lessening the volume of the space occupied by the compressed air and increasing the pressure in the reservoir. The presence of a full charge of water in the reservoir will be evidenced by the discharge of water through the safety-valve $i^6$. If now the spout-cock $e$ be opened, the pump may be operated as an ordinary pump without interfering with the supply of water in the reservoir I or in any way affecting such supply. The water in the reservoir may be drawn upon at any of the points of discharge, and the air-pressure in the reservoir is sufficient to force the last drop of water contained therein to the highest point of discharge. As soon as the charge of water in the reservoir is exhausted, (this being evidenced by the escape of air at the points of discharge when water is attempted to be drawn, if in no other way,) another charge of water can be introduced therein by operating the pump. It will not be necessary, except at occasional intervals, to increase the supply of air; but when the air in the reservoir becomes exhausted by reason of absorption in the water contained in the reservoir a fresh supply of air can be readily introduced without disturbing the water contained in the reservoir or necessitating the drawing off of the same.

It will thus be seen that my pump is capable of supplying a reservoir with water under pressure, as well as serving as an ordinary pump, and that the charge of water thus obtained will be discharged automatically, and if the reservoir used be of sufficient size will be capable for use to supply water for any of the purposes mentioned in the early portion of this specification.

Having thus fully described my invention, what I claim as new, and desire to secure by Letters Patent, is—

1. The combination with a pump, a reservoir, means for connecting said reservoir with said pump above the forcing mechanism thereof, means for preventing backflow through such connection, and a discharge-pipe extending from said reservoir, of an air-supply opening below the forcing mechanism of said pump and above water-level, means for closing the same, and means for closing the discharge-opening of said pump, substantially as described.

2. The combination with a pump, a cylinder, a reservoir, a pipe connecting said reservoir with said pump above said cylinder, a check-valve therein, and a discharge-pipe for said reservoir, of an air-supply opening below the cylinder of said pump and above water-level, means for closing the same, and means for closing the discharge-opening of said pump, substantially as described.

3. The combination with a pump, a cylinder therein, a reservoir, a pipe connecting said reservoir with said pump above said cylinder, a check-valve therein, and a discharge-pipe for said reservoir, of an air-supply pipe attached to said pump above water-level and below said cylinder, a cock for closing the same, and a cock for closing the discharge-opening of said pump, substantially as described.

4. The combination with a pump, a cylinder therein, a reservoir, a pipe connecting said reservoir with said pump above said cylinder, a check-valve therein, a discharge-pipe for said reservoir, and a safety-valve therein, of an air-supply pipe attached to said pump above water-level and below said cylinder, a cock for closing the same, and a cock for closing the discharge-opening of said pump, substantially as described.

In testimony whereof I affix my signature in presence of two witnesses.

HARRY JONES.

Witnesses:
L. M. MARBLE,
VICTOR J. EVANS.